(12) United States Patent
Baker

(10) Patent No.: US 12,179,834 B1
(45) Date of Patent: Dec. 31, 2024

(54) WORK MACHINE WITH A DIFFERENTIAL PROTECTION SYSTEM AND METHOD

(71) Applicant: Deere & Company, Moline, IL (US)

(72) Inventor: Jake J. Baker, Peosta, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/663,880

(22) Filed: May 14, 2024

(51) Int. Cl.
  *F16H 48/34* (2012.01)
  *B62D 12/00* (2006.01)
  *F16H 48/24* (2006.01)
  *F16H 48/20* (2012.01)

(52) U.S. Cl.
  CPC ............. *B62D 12/00* (2013.01); *F16H 48/24* (2013.01); *F16H 48/34* (2013.01); *F16H 2048/205* (2013.01)

(58) Field of Classification Search
  CPC ......... B62D 12/00; F16H 48/24; F16H 48/34; F16H 2048/205
  See application file for complete search history.

(56) References Cited

U.S. PATENT DOCUMENTS

| | | |
|---|---|---|
| 9,114,705 B2 | 8/2015 | Goraya et al. |
| 11,585,421 B2 | 2/2023 | Fritz et al. |
| 2018/0051786 A1 | 2/2018 | Krishnan et al. |
| 2020/0164743 A1 * | 5/2020 | Frenznick ............... F16H 48/05 |
| 2022/0097704 A1 | 3/2022 | Collins |

FOREIGN PATENT DOCUMENTS

| | | | |
|---|---|---|---|
| CN | 113353008 A | * 9/2021 | |
| CN | 117533292 A | * 2/2024 | ............ B60W 30/02 |
| DE | 112020007443 T5 | * 5/2023 | ............ F16H 48/08 |
| JP | 4230425 B2 | 2/2009 | |
| WO | WO-2018232262 A1 | * 12/2018 | ............ B60K 17/16 |

* cited by examiner

*Primary Examiner* — Justin Holmes

(57) ABSTRACT

A work machine with a differential protection system includes an electronic differential lock, a controller, and a knock sensor to convert sensed vibrations into electric signals. The controller is programmed to receive and process the electrical signals generated by the knock sensor, determine a risk of differential lock wear based on the processed signals. The program instructions include responding to the processed signals indicative of a risk of differential lock wear by inhibiting locking of the differential lock for a defined time period, and command locking the differential lock as a response to expiration of the defined period. The controller may further be programmed to command locking the differential lock as a response to a request to lock the differential lock and engagement conditions being met. The presence of a risk of differential wear is derived from a frequency and an amplitude of the processed signals.

20 Claims, 5 Drawing Sheets

WORK MACHINE WITH A DIFFERENTIAL PROTECTION SYSTEM AND METHOD

TECHNICAL FIELD

The present disclosure relates generally to a work machine with a differential protection system for controlling the locking and unlocking of the differential depending on a risk to the health of the differential to prevent hardware damage to the differential.

BACKGROUND

The health of differentials can significantly impact the performance of a work machine. For example, an articulating dump truck relies on its differential locks to distribute power evenly between the wheels and maintain traction in various terrains and under varying payloads. Worn differentials can impact the degree of engagement and can thereby result in a power imbalance and reduced traction if the locking mechanism is improperly engaged. This can be especially challenging in navigating uneven and slippery surfaces, especially during uphill or downhill operations. Differential wear can also affect the stability and maneuverability of the work machine, especially with large payloads. This engagement of automatic differential locks is typically based on pre-defined conditions, including slip detection. However, disengagement of the differential lock(s) post engagement can be sub-optimal because once the differential is mechanically locked, slip is no longer detectable and therefore can no longer be reliably disengaged consistently to avoid premature wear. The industry standard is to include a preset timer to automatically disengage the differential locks.

However, the variability of ground conditions, surface materials and route paths can cause scenarios where the differentials can be damaged or prematurely worn by turning (even slightly) with the differentials locked. Turning the vehicle in non-slippery ground conditions with the differentials locked can cause damage even if the system functions as designed. That is, a preset timer may result in periods when the differential is locked during no slip conditions resulting in both wheels rotating at the same speed, regardless of the traction or resistance encountered, or the turning angle. Therein lies an opportunity to improve how and when the differential locks engage and disengage.

SUMMARY

According to an aspect of the present disclosure, a work machine with a differential protection system and method is disclosed. The work machine includes a knock sensor, an electronic locking differential, and a controller. The knock sensor is configured to convert sensed vibrations into electric signals. The controller is programmed to receive and process the electrical signals generated by the knock sensor, determine a presence or a severity of a risk of differential wear based on the processed signals indicative of a risk of differential wear. The program instructions also include responding to the processed signals indicative of a risk of differential wear by inhibiting locking of the differential for a defined period. The controller may further be programmed to command locking of the differential as a response to expiration of the defined period. The controller may further be programmed to command locking the differential as a response to a request to lock the differential and engagement conditions being met. The controller may further be programmed to command locking of the differential responsive to a request to lock the differential, engagement conditions being met, and expiration of the defined period. Engagement conditions can include the steering angle and the speed of the work machine being less than a steering angle threshold and a speed threshold. The risk of differential wear is derived from a frequency and an amplitude of the processed signals. The controller may further be programmed to store information of the processed signals indicating detected vibration abnormalities and provide an alert when the processed signals indicating detected abnormalities exceed a threshold. The risk of differential wear is derived from a frequency and an amplitude of the processed signals. The controller may further store information of the processed signals indicating detected vibration abnormalities and provide an alert when the processed signals indicate detected abnormalities exceed a threshold.

In another embodiment, an articulating work machine comprises a front chassis, a front knock sensor coupled to the front chassis wherein the front knock sensor is configured to convert a sensed vibration into electrical signals, and a front electronic differential lock. The articulating work machine also includes a rear chassis, a rear knock sensor coupled to the rear chassis wherein the rear knock sensor is configured to convert a sensed vibration into electrical signals, and a rear electronic differential lock(s). An articulation joint is disposed between the front chassis and the rear chassis wherein the articulation joint enables relative pivotal movement between the front chassis and the rear chassis along a vertical axis wherein the articulation joint facilitates the steering of the work machine. The controller is programmed to energize a locker to lock one of the front electronic differential lock and the rear electronic differential lock in response to a work machine speed and a steering angle being less than a threshold. The controller then receives and processes the electrical signals generated by the front knock sensor and the rear knock sensor. The controller is then programmed to determine a risk of differential wear based on the processed signals, deenergize the locker to unlock one of the front differential and the rear differential in response to signals indicative of worn differential locks. In response to the processed signals indicative of a risk of differential wear, the controller is programmed to inhibit locking of the differential for a defined period.

The controller may further be programmed to command locking of the differential in response to expiration of the defined period.

The controller may further be programmed to, in response to a request to lock the differential and engagement conditions being met, command locking the differential.

The controller may further be programmed to command the differential as a response to a request to lock the differential, engagement conditions being met, and an expiration of the defined period. The engagement condition includes one of a work machine speed and a steering angle being less than a threshold.

A method for performing predictive differential control on a work machine comprises, in a first step, receiving and processing a historical electrical signal data generated by a knock sensor associated with the presence or a severity of a sensed vibration of a differential lock. Then the method includes extracting one or more features from the processed historical electrical signal data wherein the one or more features associated with the wear of the differential track. In a next step, the method includes training a predictive model using the one or more features and a labeled dataset regarding a health information of the differential lock. Next the method includes applying the predictive model to the one or more features to generate a prediction of the health information of the differential lock. In a next step, the method includes unlocking the differential in response to a processed electrical signal indicative of a risk of differential wear, and inhibiting locking of the differential for a defined period that starts in response to the unlocking of the differential. The defined period is based on the health information of the differential lock. A feature from the historical electrical signal data comprises one or more of a steering angle, and a speed of the work machine. The method further includes storing information of the processed signals indicating detected vibration abnormalities and providing an alert when the processed signals indicating detected abnormalities exceed a threshold. The method further comprises commanding locking the differential in response to expiration of the defined period. The method applies to one or more of a front electronic differential coupled to a front chassis and a rear electronic differential coupled to a rear chassis. The feature from the historpical electrical signal data comprises one or more of a frequency of the processed signals, and an amplitude of the processed signals.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
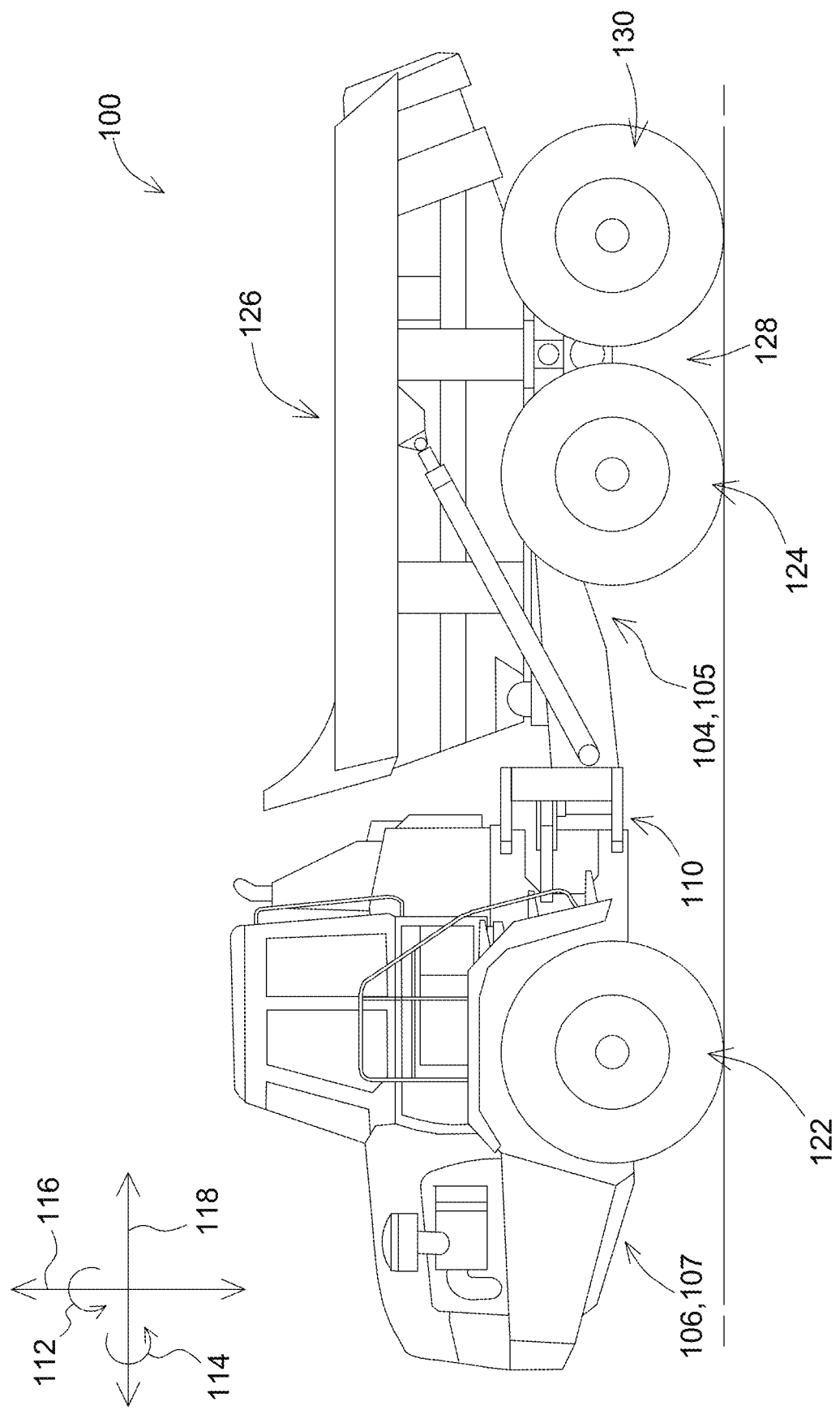
FIG. 1 is a side view of one exemplary embodiment of a work machine with a differential protection system, shown as an articulating dump truck.

FIG. 1 illustrates an exemplary embodiment of an articulating work machine 100 shown as an articulating dump truck, that includes a cab portion 106 and a trailer portion 104. Cab portion 106 includes a first frame 107, and trailer portion 104 includes a second frame 105. First frame 107 is connected to second frame 105 through a coupling assembly 110. In the illustrated embodiment, coupling assembly 110 includes a pivot frame coupling 112 and a rotational frame coupling 114. Pivot frame coupling 112 provides for articulating movement or pivoting, of second frame 105 relative to first frame 107 about a vertical axis 116. Rotational frame 114 coupling provides for rotation movement of second frame 105 relative to first frame 107 about a longitudinal axis 118. In one embodiment, work machine 100 may include one or more hydraulic actuators to control the angle between the first frame 107 and second 105 frames for steering the work machine 100.

First frame 107 illustratively supports a cab portion 106 and an engine or battery power source for propelling the work machine 100. A first or front wheel assembly 122 includes a pair of wheels for providing rolling support to cab portion 106. A dump body or bin 126 for containing a load is supported by second frame 105. An actuator, such as a hydraulic cylinder, may be coupled to bin for angularly elevating bin relative to the second frame 105.

Figure 2:
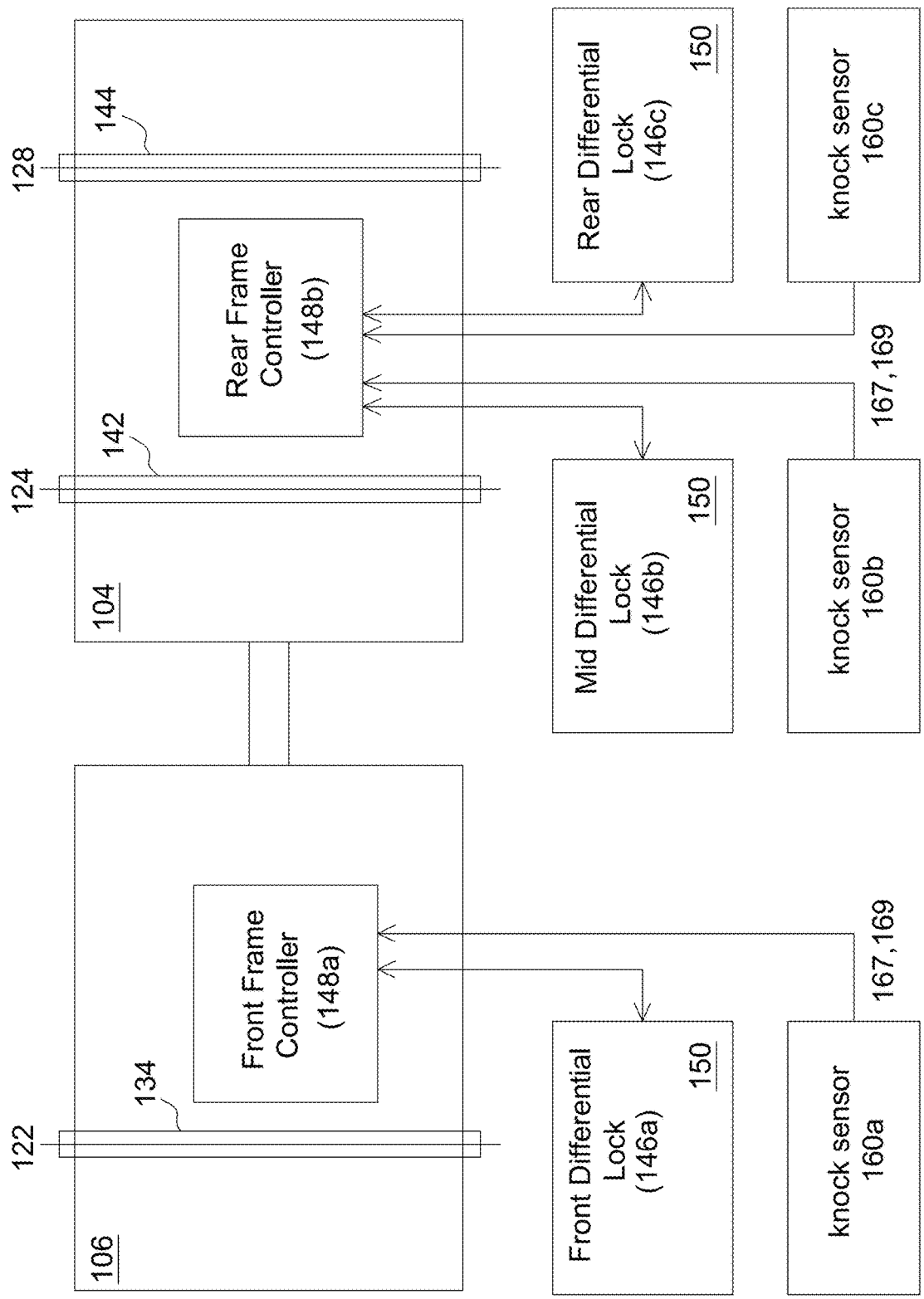
FIG. 2 is is a schematic diagram of a work machine including a controller and a differential according to one or more embodiments of this disclosure.

A second or rear wheel assembly 128 is operably coupled to second frame 105 for supporting the trailer portion 104. Referring to FIG. 2 with continued reference to FIG. 1, the rear wheel assembly 128 illustratively includes a first rear wheel assembly 124 and a second rear wheel assembly 130. First and second rear wheel assemblies each illustratively include a left wheel and a right wheel. In the illustrated embodiment, each of first rear wheel assemblies 124, and the second rear wheel assemblies are rotatably coupled to a tandem or walking beam. Work machine 100 may include alternative wheel assembly configurations. For example, fewer or more wheels and/or axles may support trailer portion 104, and/or cab portion 106.

Now turning to FIG. 2 with continued reference to FIG. 1, the front wheel assembly 122 includes a front axle 132 coupled between wheels, and a differential 134 coupled to the front axle 132. Alternatively, the first rear wheel assembly 124 and the second rear wheel assembly may function like a bogie axle wherein the first rear axle 138 includes a first differential 142, and the second rear axle 140 includes a second differential 144.

The differential locks (146a, 146b, 146c, collectively referred to as 146) selectively disengage or lock the differential (134, 142, 144). When engaged, a differential lock 146 essentially turns the differential into a solid shaft, forcing both wheels on an axle to rotate at the same speed. In one exemplary embodiment, the differential locks (146a, 146b, 146c) may include a clutch assembly. In particular, when the lock 146 is engaged or closed, the differential (134, 142, 144) is in a locked state, and a first portion (not shown) of the drive shaft is locked to a second portion (not shown) to rotate therewith. One or more than each of the differentials (134, 142, 144) may be locked. When the lock 146 is disengaged or opened, the differential is in an unlocked and operational state, thereby allowing the first portion (not shown) and second portion (not shown) to rotate at different speeds. The differential lock 146 may be configured to completely lock the differential or to partially lock the differential. For example, lock 146 may limit rotation of front portion or drive shaft relative to second portion of drive shaft without completely locking front portion to second portion. Furthermore, not every differential lock (146a, 146b, and 146c) needs to be engaged simultaneously because the lock disposition will rely on the individual state of each respective differential (132, 142, 144) and slip conditions.

In one embodiment, the differential lock (146a, 146b, and 146c) includes an electronic differential lock 150 that is in communication with the controller 148. The differential lock (146a, 146b, and 146c) includes an electronically actuated locker configured to lock the left and right half shafts relative to each other when engaged and permit relative rotation between the half shafts when disengaged. The differential locks 146 are in communication with the controller 148 and locks the differential 150 in response to a command from their respective controller (148a, 148b) through an electronically actuated mechanism such as a differential lock solenoid.

The electronic differential lock 150 has an unlocked state (disengaged) in which the half shafts are permitted to rotate independent of each other, and a locked state (engaged) in which the half shafts are rotationally fixed to each other. The differential 150 may be placed in the locked state by coupling the half shafts via an electronically actuated mechanism such as a differential lock solenoid.

Work machines equipped with electronic differential locks 150 may include controls for monitoring the work machine speed 178 and steering angle 176 so that the lock 150 of the differential is not commanded when the work machine speed 178 or the torque of the powertrain exceeds a threshold. That is, a differential lock (146*a*, 146*b*, and 146*c*) should generally not engage at high speeds and sharp turns. However, the monitoring of work machine speed 178, and steering angle 176 alone may be insufficient to prevent ratcheting and thereby creates a risk of differential wear in all operating conditions with no slip by the work machine 100.

In the present embodiment, the work machine 100 includes a differential protection system 500 and a knock sensor 160 adapted to convert sensed vibrations 167 into electrical signals 169. The knock sensor can advantageously anticipate an unwanted and potentially damaging phenomenon caused by worn differential locks 146 by detecting ratcheting type sounds. Each respective knock sensor (146*a*, 146*b*, 146*c*) is typically mounted in proximity to its respective differential lock (134, 142, 144) and is designed to detect the vibrations and noise associated with sudden changes caused by a worn differential lock.

The threshold at which a knock sensor senses engine knock can vary depending on the specific design and calibration of the sensor. Generally, knock sensors are sensitive to small vibrations and noise levels that are characteristic of engine knock. They are designed to detect these abnormal combustion events and send a signal to the engine control unit (ECU) to adjust the ignition timing or fuel mixture to prevent further knock and protect the engine from damage.

The differential protection system 500 controls the locking and unlocking of the differential lock (146*a*, 146*b*, and 146*c*) depending on the health of components (i.e. wear) to prevent hardware damage to the differential 134.

Figure 3:
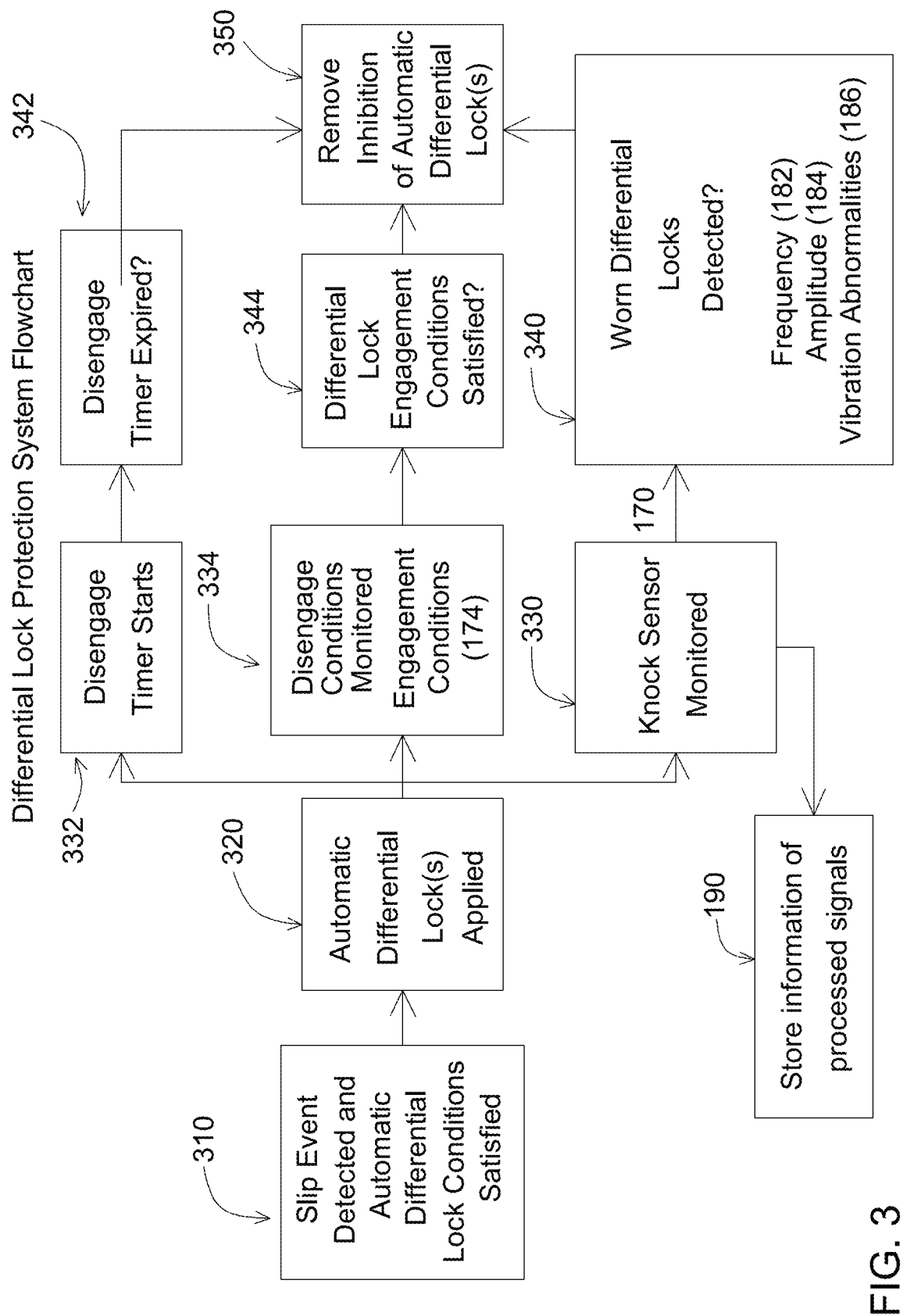
FIG. 3 is a flow chart illustrating an algorithm for controlling a differential.

As seen in the differential protection system flow diagram of FIG. 3, in a first step 310 a detected slip event will automatically initiate an application of a differential lock (146*a*, 146*b*, and 146*c*) provided certain engagement conditions 174 are met. This initiation results in step 320 when the automatic differential lock 146 is applied. Once this occurs, three features (steps 332, 334, and 330) are simultaneously monitored wherein in one or more of these features (332, 334, 330) may result in disengagement of the automatic differential lock (146*a*, 146*b*, and 146*c*) (i.e. unlocking of the electronic differential lock 150) at step 350 in response to the electrical signals 169 received and processed from the knock sensor 160 indicating a risk of differential wear. In step 355, the controller 148 further has instructions to continue inhibiting locking of the electronic differential lock 150 for a defined period in response to the risk of differential wear. For example, the differential lock 150 remains locked so long as ratcheting is not sensed. Now returning to step 330, the controller 148 is programmed to receive the electrical signals 169 generated by the knock sensor 160 that are derived from sensed vibrations 167 and determine a risk of differential wear based on these processed signals 170. A processor 87 in the controller 148 may use a filtering mechanism adapted to filter out noise and irrelevant vibrations to further process the electrical signals 169 generated by the knock sensor 160. The signal processor 87 may further determine the frequency and amplitude of knocking vibrations, allowing the controller 148 to respond to indications of the risk of differential wear based on the severity and characteristics of the detected knocking events as derived from the processed signals 170.

The controller 148 is further programmed to include unlocking the differential 134 in step 350 in response to detected processed signals 170 indicative of worn differential locks from step 340. Differential wear may exhibit a grinding, clanking, or whining type sound. These sounds can be caused by a lack of lubrication, worn differentials, or simply locking the differential in conditions with slip. The identification of processed signals 170 indicative of a risk of differential wear may include electrical signals 169 from a range either a machine-learned data with use and analyzation of historical data, or simply a predetermined threshold. This diagnostic mechanism integrated into the controller 148 is adapted to store information about the detected knocking events, and to provide alerts or notifications to the work machine operator or maintenance personnel for further investigation when knocking events exceed a determined threshold and/or disengage the differential lock (146*a*, 146*b*, and 146*c*). Another means of determining when to disengage a differential lock (146*a*, 146*b*, and 146*c*) include monitoring of engagement conditions 174 as in step 334 wherein the disengagement condition 174 may include steering angle 176 or a work machine speed 178. Current industry standards typically include usage of a timer as seen in step 332, wherein the respective differential lock 146 disengages after a timed period as seen in step 342. For automatic differential lock 146 engagement and disengagement, each axle (122, 124, 128) may act independently of one another. In the present embodiment of the articulating dump truck, the front differential lock 146*a* coupled to the front axle 132 may respond to a front frame controller 148*a* and a front knock sensor 160*a*. The mid differential lock 146*b* couple to a first rear axle 138 and the rear differential lock 146*c* coupled to a second rear axle 140 may respond to a rear frame controller 148*b*.

Finally, the program instructions responsive to the processed signals 170 indicative of worn differential locks, disengage the differential 134 for a defined period or until the processed signals 170 indicative of a risk of differential wear ends (i.e. returns to normal operating conditions). The disengagement of the automatic differential locks (146*a*, 146*b*, and 146*c*) as shown in step 350 may be countered by a servicing event where the system is reset or the processed signals 170 from the knock sensor(s) fall below a threshold or within a predetermined range. This threshold may vary depending on the machine type, placement of the knock sensor 160, worksite attributes, and the type of differential lock, to name a few.

Preemptively disengaging the differential locks 146 using the input from the knock sensor 160, rather than solely relying on the expiration of the disengagement timer, advantageously reduces instances where due to changing ground conditions and terrain the differential(s) being damaged or prematurely worn are further worn by turning (even slightly) with the differentials locked up and thereby extends the life use of the differential. Removing the conditional state of disengaging the automatic differential lock may also occur if the automatic differential lock conditions are no longer satisfied. The condition may include, but are not limited to, changing the steering angle 176 from turning to a straightforward direction, or a reduction in speed.

The controller 148 may further be programmed to command enable locking of the differential 134 as shown in step 350 responsive to a request to lock the differential (i.e. overriding the status of the differential lock based on the processed signals 170 from the knock sensor(s), and engagement conditions 174 being met).

The controller 148 may further be programmed to command enable locking of the differential responsive to a request to lock the differentials, engagement conditions 174 being met, and an expiration of the defined period as shown in step 342.

The engagement conditions 174 include one or more a steering angle 176 and a speed 178 being less than a threshold.

The risk of differential wear is derived from a frequency 182 and an amplitude 184 of the processed signals 170.

The controller 148 may further be programmed to store information 190 of the processed signals 170 indicating detected vibration abnormalities 186 and provide an alert 188 when the processed signals 170 indicating detected vibration abnormalities 186 exceed a threshold.

In an articulating work machine 100, the front chassis 102 includes a front knock sensor 160a to convert a sensed vibration 167 into electrical signals 169 for the front electronic differential lock 146a, and a rear knock sensor 160b coupled to the trailer portion 104 wherein the rear knock sensor 160b is configured to convert the sensed vibrations 167 into electrical signals 169. A controller 148 is programmed to energize a locker to lock one of the front differential lock and the rear differential lock in response to a work machine speed 178 and steering angle 176 being less than a threshold.

The controller 148 is then programmed to receive and process the electrical signals 169 generated by the front knock sensor and the rear knock sensor, determine a risk of differential wear based on the processed signals 170, and determine a risk of differential wear based on the processed signals 170. The controller 148 is further programmed to deenergize the locker to unlock one of the front differential and the rear differential in response to signals indicative of worn differential locks, and inhibit locking of the differential for a defined period. The inhibition of locking may occur from inhibiting energizing of the differential lock.

The controller 148 may be further programmed to, responsive to an expiration of the defined period, command locking of the differential.

The controller 148 is further programmed to command locking of the differential responsive to a request to lock the differential, engagement conditions 174 being met, and expiration of the defined period.

The engagement condition 174 includes one of a work machine speed 178 and a steering angle 176 being less than a threshold. Work machine speed 178 and turning angle may have an impact on locking a differential. At higher speeds, the differential is more likely to remain unlocked to allow for smooth turning and maneuverability. Lock differentials may contribute to tire scrubbing and binding. When the work machine is moving slowly or when there is a high demand for traction, such as when driving off-road or on slippery surfaces, the differential may automatically lock to provide better traction to both wheels. The turning angle can also affect the engagement of the differential lock. In some work machines, the differential lock may disengage during sharp turns to allow for better macuverabiltiy. Overall, the engagement of the differential lock is included by work machine's speed 178 and turning angle to balance between traction and maneuverability.

The presence and severity of a risk of differential wear is derived from a frequency and an amplitude of the processed signals 170. The control will analyze the processed signals 170 with defined thresholds and patterns to identify a racheting, jarring, or other vibration for preventing wear on a differential. The controller 148 continuously monitors the processed signals 170. If an abnormal vibration persists, a trigger warning light may notify the operator, and the differential may lock before the time period initiated by the timer.

The controller 148 further stores information of the processed signals 170 indicating detected vibration abnormalities and provide an alert when the processed signals 170 indicating detected abnormalities exceed a frequency threshold.

Figure 4:
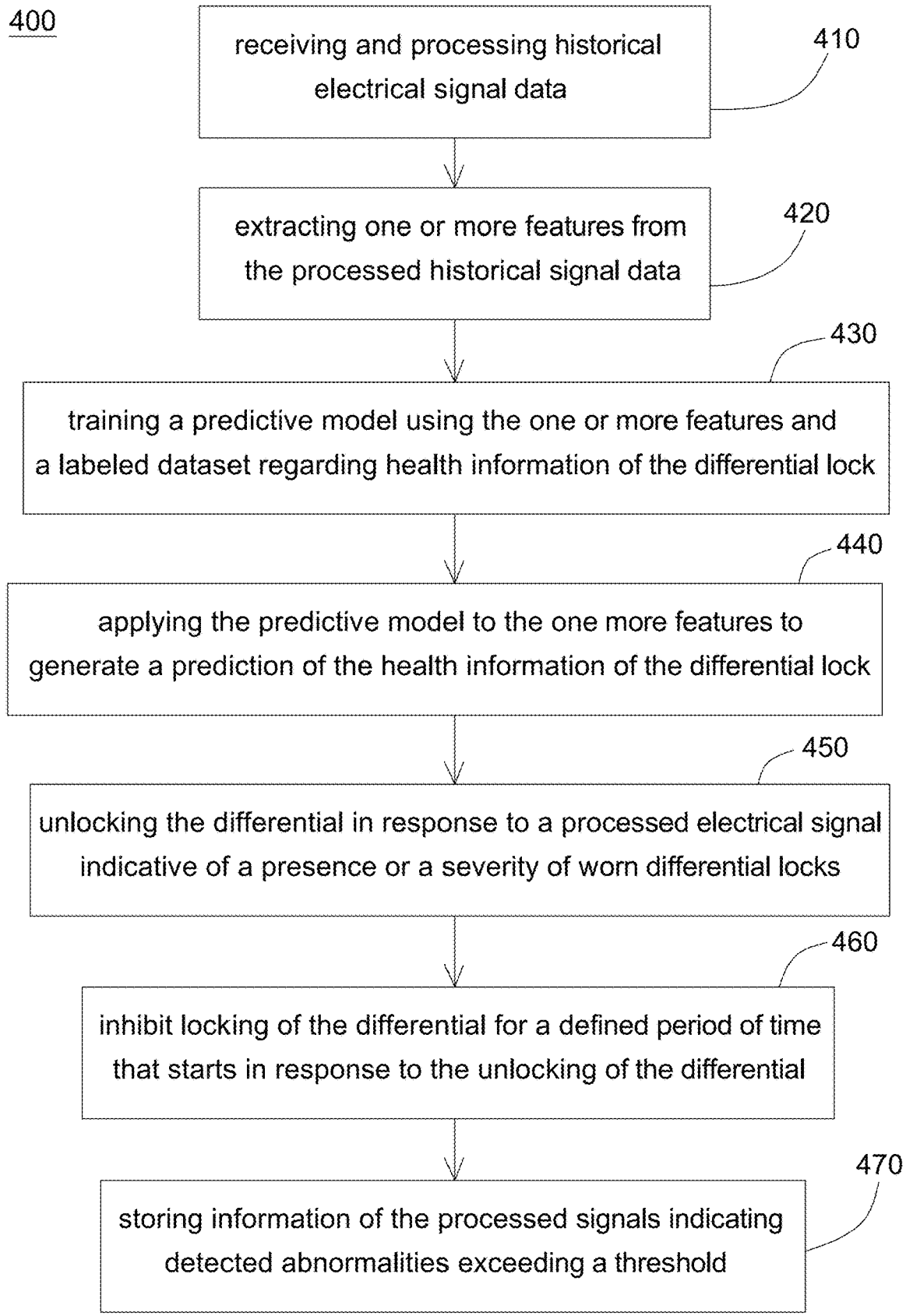
FIG. 4 is a method for performing predictive differential control on a work machine.
Figure 5:
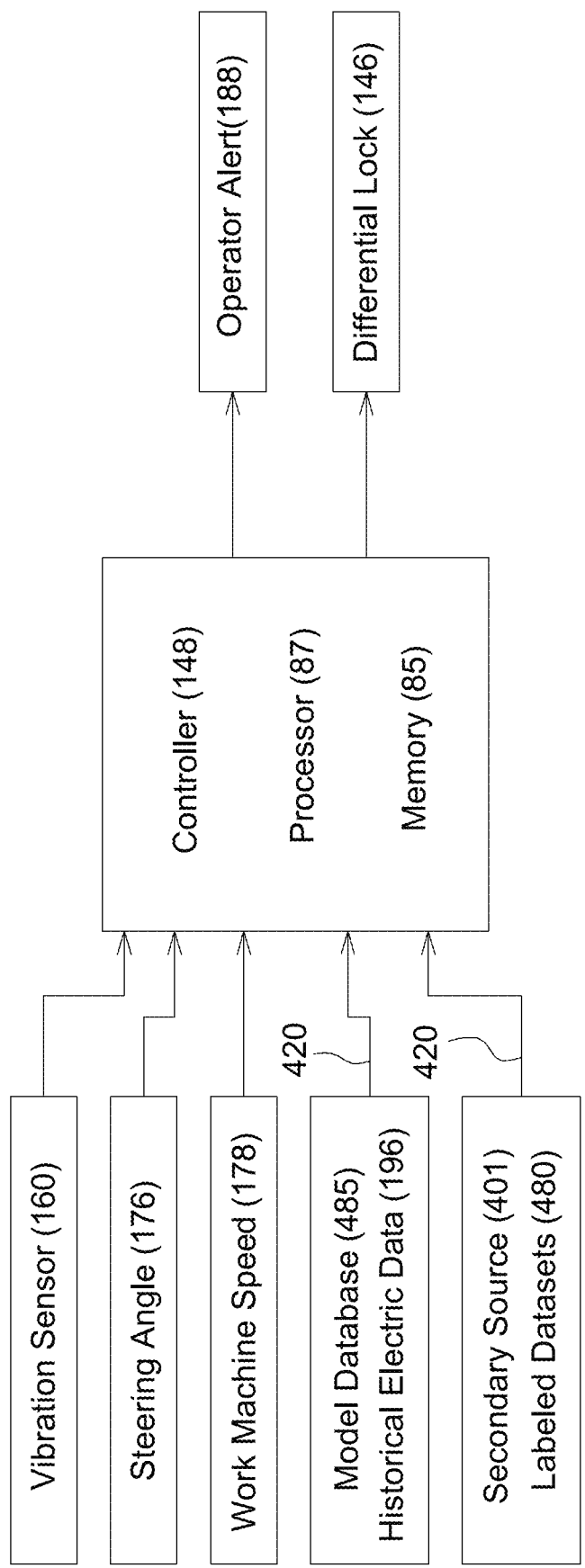
FIG. 5 is a diagram for a predictive differential protection system.

In another embodiment, a method 400 of performing a predictive differential control on a work machine 100 is shown in FIG. 4 and comprises of the following steps. In step 410, the method 400 includes receiving and processing historical electrical signal data 196 generated by the sensor (e.g. a knock sensor) associated with a presence or a severity of a sensed vibration 167 when the differential 134 is locked.

In step 420, the method 400 includes extracting one or more features from the processed historical electrical signal data 196 wherein the one or more features is associated with the wear of the differential 134.

In step 430, the method includes training a predictive model using the one or more features and a labeled dataset regarding a health information of the differential lock.

In step 440, the method includes applying the predictive model to the one or more features to generate a prediction of the health information of the differential lock.

In step 450, the method includes unlocking the differential in response to a processed electrical signal 170 indicative of a risk of differential wear, and in step 460 inhibiting locking of the differential for a defined period that starts in response to the unlocking of the differential, wherein the defined period is based on the health information. A feature from the historical electrical signal data 196 comprises one or more of a steering angle 176, and a speed 178 of the work machine 100. In step 470, the method 400 may further comprise storing information of the processed signals 170 indicating detected vibration abnormalities and providing an alert when the processed signals 170 indicating detected abnormalities exceeding a threshold. The controller 148 is further programmed to, responsive to expiration of the defined period, command locking the differential. The method 400 applies to one of a front electronic differential coupled to a front chassis and a rear electronic differential coupled to a rear chassis. The historical electrical signal data 196 comprises one or more of a frequency of the processed signals 170, and an amplitude of the processed signals 170. As such, a method 400 may be embodied as a program or algorithm operable on a controller 148. It should be appreciated that the controller 148 may include any device capable of analyzing data from various sensors, comparing data, making decisions, and executing the required tasks.

By continuously monitoring and adjusting the differential lock conditions, the sensor advantageously helps maintain optimal performance and fuel efficiency while preventing damage due to ratcheting.

As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 148 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 148 may be in communication with other components on the work machine, such as hydraulic components, electrical components, and operator inputs within an operator station of an associated work machine. The controller 148 may be electrically connected to these other components by a wiring harness such that messages, commands, and electrical power may be transmitted between the controller 148 and the other components or wirelessly. Although the controller 148 is referenced in the singular, in alternative embodiments the configuration and functionality described herein can be split across multiple devices using techniques known to a person of ordinary skill in the art. The controller 148 includes the tangible, non-transitory memory on which are recorded computer-executable instructions, including a predictive maintenance for a track chain undercarriage algorithm. The processor of the controller 148 is configured for executing the predictive differential control algorithm.

The controller 148 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The one or more processors 87 train a predictive model 420 using the one or more features 410, the historical inspection data 430, and a labeled dataset 480 stored in memory 85 regarding an actual maintenance need or health information of the tracked undercarriage 20. The features 410, labeled datasets 480, also referred herein collectively as training data 420, may be received from, for example, multiple secondary users 401. In some embodiments, the processors 87 generate the models using machine learning functions. Machine learning functions are generally functions that allow a computer application to learn without being explicitly programmed. In particular, a computer application performing machine learning functions is configured to develop an algorithm based on training data 420. For example, to perform a supervised learning, training a predictive model 420 includes example inputs and corresponding desired outputs, and the processor progressively develops a model that maps input to the outputs 470 included in the training data 420. Machine learning may be performed using various types of methods and mechanism including but not limited to decision tree learning, association rule learning, artificial neural networks, inductive logic programming, support vector machines, clustering, Bayesian networks, reinforcement learning, representation learning, similarity and metric learning, sparse dictionary learning, and generic algorithms.

Accordingly, the processor 87 in this example performs machine learning using the received training data (420, 480) to train and develop a predictive model 420 that outputs a prediction or health information. Additionally, maintenance scheduling suggestions may shift depending on the aftermarket component type used, and the maintenance habits of the operator. The predictive model(s) 420 generated by the processor(s) 87 may be stored in a model database 485 in memory 85. In some embodiments, the model database 485 is stored and transmitted from a cloud via a communication network, or external server. The model database 485 may be stored on a separate device specific to a worksite, an operator, a work machine, to name a few. Alternatively, or in addition to, the models generated by the processor 87 may be copied to one more separate devices such as databases external to the server. Secondary sources 401 of data from other machines may also serve as a predictive model 420.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A work machine comprising:
 a knock sensor configured to convert sensed vibrations into electrical signals;
 an electronic differential lock; and
 a controller programmed to:
 receive and process the electrical signals generated by the knock sensor,
 determine a risk of differential wear based on the processed signals,
 unlock the electronic differential lock, when locked, in response to the processed electrical signals indicative of a risk of differential wear; and
 inhibit locking of the electronic differential lock for a defined period responsive to the processed electrical signals indicative of a risk of differential wear.

2. The work machine of claim 1, wherein the controller is further programmed to responsive to expiration of the defined period, command enabling locking of the electronic differential lock.

3. The work machine of claim 2, wherein the controller is further programmed to, responsive to a request to lock the electronic differential lock and engagement conditions being met, command enabling locking of the differential lock.

4. The work machine of claim 1, wherein the controller is further programmed to command enabling locking of the electronic differential lock responsive to a request to lock the electronic differential lock, engagement conditions being met, and expiration of the defined period.

5. The work machine of claim 4, wherein the engagement conditions include a steering angle and a speed being less than a threshold.

6. The work machine of claim 1, wherein a presence and severity of the risk of differential wear is derived from a frequency and an amplitude of the processed signals.

7. The work machine of claim 1, wherein the controller is further programmed to store information of the processed signals indicating detected vibration abnormalities and provide an alert when the processed signals indicating detected abnormalities exceed a threshold.

8. An articulating work machine comprising:
a front chassis;
a front knock sensor coupled to the front chassis, the front knock sensor configured to convert a sensed vibration into an electrical signals;
a front electronic differential lock;
a rear chassis;
a rear knock sensor coupled to the rear chassis configured to convert a sensed vibration into electrical signals;
a rear electronic locking differential;
an articulation joint disposed between the front chassis and the rear chassis wherein the articulation joint enables relative pivotal movement between the front chassis and the rear chassis along a vertical axis, facilitating a steering of the work machine; and
a controller programmed to,
energize a locker to lock one of the front differential lock and the rear differential lock in response to a slip condition and an engagement condition, receive and process the electrical signals generated by the front knock sensor and the rear knock sensor;
determine a presence or a degree of severity of a risk of differential wear based on the processed electrical signals;
deenergize the locker to unlock one of the front electronic differential lock and the rear electronic differential lock in response to the processed electrical signals indicative of a risk of differential wear; and
inhibit locking of the electronic differential lock for a defined period responsive to the processed electrical signals indicative of a risk of differential wear.

9. The work machine of claim 8, wherein the controller is further programmed to, responsive to expiration of the defined period, uninhibit locking of the front electronic differential lock and the rear electronic differential lock.

10. The work machine of claim 9, wherein the controller if further programmed to, responsive to a request to lock the electronic differential lock and engagement conditions being met, command locking of the electronic differential lock.

11. The work machine of claim 8, wherein the controller is further programmed to command locking of the electronic differential lock responsive to a request to lock the electronic differential lock, engagement conditions being met, and expiration of the defined period.

12. The work machine of claim 11, wherein the engagement condition includes one of a work machine speed and a steering angle being less than a threshold.

13. The work machine of claim 8, wherein the presence and severity of a risk of differential wear is derived from a frequency and an amplitude of the processed signals.

14. The work machine of claim 8, wherein the controller further stores information of the processed signals indicating detected vibration abnormalities and provide an alert when the processed signals indicating detected abnormalities exceed an abnormality threshold.

15. A method for performing a predictive differential control on a work machine, comprising:
receiving and processing a historical electrical signal data generated by a knock sensor associated with a sensed vibration of a differential lock;
extracting one or more features from the processed historical electrical signal data, the one or more features associated with the wear of the differential lock;
training a predictive model using the one or more features and a labeled dataset regarding a health information of the differential lock;
applying the predictive model to the one or more features to generate a prediction of the health information of the differential lock;
unlocking the differential lock when in a locked status in response to a processed electrical signal indicative of a risk of differential lock wear; and
inhibiting locking of the differential lock for a defined period that starts in response to the unlocking of the differential lock, the defined period based on the health information.

16. The method of claim 15, wherein a feature from the historical electrical signal data comprises one or more of:
a steering angle; and
a speed of the work machine.

17. The method of claim 15 further comprising:
storing information of the processed electrical signals indicating detected vibration abnormalities; and
providing an alert when the processed electrical signals indicating detected abnormalities exceed a threshold.

18. The method of claim 15 further comprising:
commanding locking the differential lock in response to an expiration of the defined period.

19. The method of claim 15, wherein the method applies to one of a front electronic differential lock coupled to a front chassis and a rear electronic differential lock coupled to a rear chassis.

20. The method of claim 15, wherein a feature from the historical electrical signal data comprises one or more of:
a frequency of the processed signals; and
an amplitude of the processed signals.

* * * * *